United States Patent [19]

Sellari, Jr.

[11] 3,743,945

[45] July 3, 1973

[54] LIMITER FOR MULTI FREQUENCY VOICE RECEIVER

[75] Inventor: Daniele Sellari, Jr., Corinth, Miss.

[73] Assignee: International Telephone and Telegraph Corporation, New York, N.Y.

[22] Filed: Dec. 23, 1970

[21] Appl. No.: 100,951

[52] U.S. Cl. .................... 328/28, 307/235, 307/246

[51] Int. Cl. ........................................ H03k 5/08

[58] Field of Search ................ 328/13, 28, 31, 118; 307/261, 235, 215

[56] References Cited

UNITED STATES PATENTS

| | | | |
|---|---|---|---|
| 3,408,581 | 10/1968 | Wakamoto et al. | 328/118 |
| 3,108,258 | 10/1963 | Eckl | 307/215 |
| 3,497,723 | 2/1970 | Nelson | 307/261 |
| 3,205,445 | 9/1965 | Cubert | 307/261 |

OTHER PUBLICATIONS

Electronics, Two I. C., Comparators Improve Threshold Converter, George Oshiro 12/23/1968 page 59

*Primary Examiner*—H. K. Saalbach
*Assistant Examiner*—B. P. Davis
*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

A multi-frequency receiver for use in telecommunications system receives tones within the audio frequency range. The tones transmitted to the receiver must be selectively separated, amplified, shaped, selectively separated once again into individual frequency bands and validated, through individual stages of the receiver. In each stage, a series of tests are applied to the tones before digital signals are transmitted responsive to the tone. The pulse shaping or limiting, associated with amplification and the tone signal check undertaken in that stage within the framework set out herein, is disclosed.

5 Claims, 3 Drawing Figures

Inventor
DANIELE SELLARI, JR.
BY
Marvin Chaban
ATTY.

LIMITER FOR MULTI FREQUENCY VOICE RECEIVER

BACKGROUND OF THE INVENTION

The system within which my limiter operates is disclosed in greater detail in my copending application executed and filed with this application, entitled "Multi Frequency Receiver."

In that system, multi-frequency signals are fed to the first filtering stage of the receiver and tones below a predetermined frequency are deleted. Those within a first frequency range are passed as are those within a second frequency range. Signals passed by this stage are in a generally sinusoidal wave form in either the first range or the second range, both ranges within the audio band. The signals in each range are individually amplified and shaped by the limiter stage for transmission to the second filtering stage. The second filtering stage comprises a plurality of band pass filters in each frequency range for selectively segregating specific frequency bands within each range.

A limiter of the type known in the art is shown in U.S. Pat. No. 3,076,059 to L. A. Meacham et al. on Jan. 29, 1963 for Signaling System. In that disclosure, a push-pull output stage comprised of two complementary transistors is employed.

SUMMARY OF THE INVENTION

The limiter employed in the present invention receives tones in signals in essentially sinusoidal form. The signals are applied to two amplifiers, each amplifier biased to receive and amplify one component of the signal wave form. Each component is compared against a reference potential to trigger a specific amplifier into conduction when the signal reaches an amplitude greater than that of the reference potential applied to that amplifier. Each amplifier has its output connected to one input of a two-input NAND inverter gate. The two gates have their outputs cross-connected to the input of the other gate to approximate the effect of an RS flip-flop. An output transistor is triggered by one gate to produce an output signal in essentially square wave form on the occurrence of a signal of proper amplitude from each amplifier.

By this arrangement, each component of the input signal must be of predetermined minimum amplitude to generate an output signal, the output signal being of essentially square wave at the same frequency as the input signal.

It is therefore an object of the invention to provide in a multi-frequency receiver a limiter receptive of voice frequencies of sinusoidal form to produce an essentially square wave output at frequency consistent with the received frequency.

It is a further object of the invention to provide a multi-frequency receiver limiter with improved reliability and reproducability.

It is a still further object of the invention to provide a new limiter adapted for voice frequencies which produces either a signal of proper wave form or no signal at all.

It is a still further object of the invention to produce a multi-frequency limiter which includes a pair of inverted operational amplifiers feeding gates to produce an output signal of proper wave form.

Other objects, features and advantages of my invention will become clear from the accompanying drawings when viewed in conjunction with the following description.

BRIEF DESCRIPTION OF THE DRAWINGS

In FIG. 1, I show a block diagram of a network for receiving and validating tone signals received from common control 10 of a telecommunications system, the tone receiver including the subject of this invention. While I show the input 12 to the system as deriving from the common control 10, this path may come through a telephone line circuit or other suitable path, the signals received thereover having been originated at a telephone subscriber station or data terminal (not shown) having multi-frequency tone originating equipment.

As is well-known in the art, suitable oscillators respond to the depression of push buttons at a telephone instrument to produce multi-frequency tones within the voice frequency band corresponding to the respective push button depressed. The tones are transmitted over the line in the sequence generated. The tone signals must be distinguished from any random voice or audio messages transmitted to the line. The tone signals must be validated and translated into suitable code signals for transmission of the resulting binary or decimal signals to suitable memory equipment for controlling switching systems or the like.

The tone frequencies following much experimentation have been standardized and the coding system in general use at the present is the two out of eight code in which two frequencies out of the eight available represent each digit. The frequencies are grouped into a high group and a low group, and a signal must include one frequency from each group to be valid. The generated signal must be of proper duration to be classified as a valid signal. Naturally each frequency must fall within a predetermined frequency range and be of at least a minimum amplitude to be acceptable and to constitute part of a valid signal.

It is these conditions and requirements that the present system is designed to meet.

Figures 1, 3:
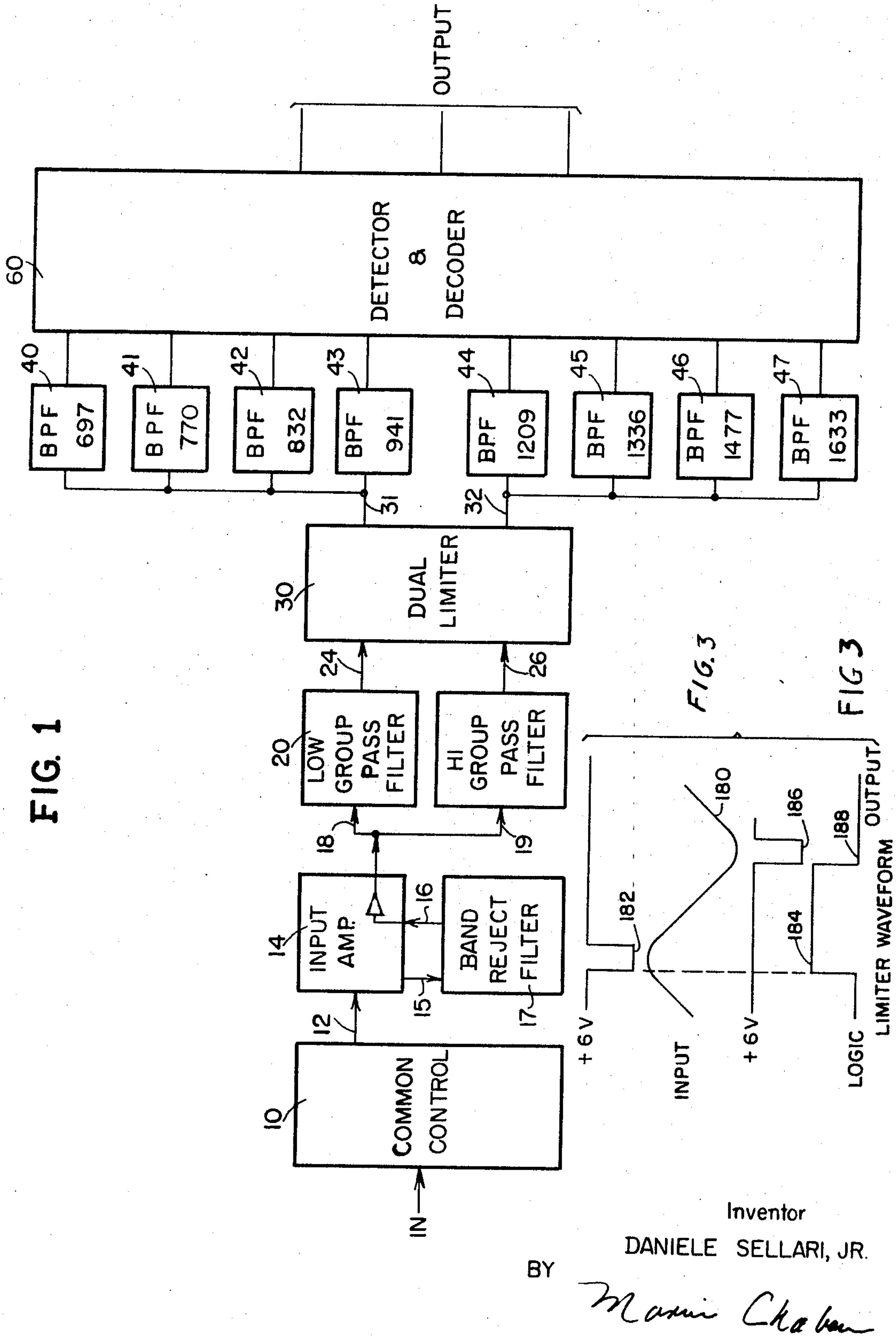
FIG. 1 is a schematic block circuit of a multi-frequency voice receiver employing my invention.
FIG. 3 is a schematic drawing of wave pattern produced by the limiter of FIG. 2.

FIG. 1 shows an input 12 to my receiver feeding an input amplifier 14. This amplifier provides a high resistance bridge across the line, has inherent impedance matching and provides transient protection.

The signals received by amplifier 14 are sent to low band reject filter 17 which acts to reject all signals below 680 Hz. This upper limit of this band is below the tolerance level of the lowest tone signal frequency, i.e. 697 Hz. Filter 17 serves to reject all low frequencies such as those resulting from dial tone, low frequency random noise and the like. The signal passed by filter 17 is transmitted back over lead 16 to the amplification section of amplifier 14 and transmitted in multiple over leads 18 and 19 to the respective group pass filters 20 and 22.

The cutoff level for group low pass filter 20 is 965 Hz., the filter passing only frequencies ranging below that level. This cutoff level has been selected to pass to output lead 24 all frequencies of the lower group including the signals within the acceptable tolerance range of the highest of the low frequency group, i.e. 941 Hz.

High pass group filter 22 passes signals above 1,180 Hz., this acceptance level having been selected to pass to its output lead 26 all acceptable signals within the tolerance range of the lowest high group frequency, i.e. 1,209 Hz.

The signals passed by the respective group pass filters 20 and 22 on their respective output leads 24 and 26 are fed to the dual limiter circuit 30. The signals in the respective low and high groups are maintained separately, the signals are determined to be of sufficient amplitude to pass the acceptance threshold and shaped into essentially square wave form for transmission to the respective band pass filters of the low group on lead 31, and to the band pass filters of the high group on lead 32. The limiter as employed herein forms the substance of the invention claimed herein.

A multiple path from the low range limiter section lead 31 feeds the respective band pass filters of the low group—filter 40 which passes the 967 Hz. band, filter 41 which passes the 770 Hz. band, filter 42 which passes the 852 Hz. band and filter 43 which passes the 941 Hz. band.

A multiple path from the low range limiter lead 32 is coupled to the respective band bass filters of the high group, i.e. filter 44 for 1,209 Hz. band, filter 45 for the 1,336 Hz. band, filter 46 for the 1,477 Hz. band, and filter 47 for the 1,633 Hz. band. If only 10 digits and no other code signals are being used in the system, filter 47 may be omitted or its output may be blanked as this frequency is used only for added digital information separate from the decimal ten digit system employed for telephone switching.

Each of these filters passes a frequency band within 2 to 2½ percent of the basic frequency for that filter. The individual filters 40–47 pass their respective output frequency bands to the detector and amplifier unit 60 over the respective leads 50–57. Unit 60 in conjunction with Valid Signal Controller 66 serve to validate the received signals for minimum duration, for strength and for group positioning.

A valid signal comprising one frequency tone in each group will pass its frequencies on respective leads 70–77 to the respective group memories 80 and 82. When these signals coincide with a valid signal indication on lead 84, the passed frequencies are stored for a delay period. When the proper signal duration has been observed, the frequencies stored are passed to the decoder 100 over the respective memory leads 90–97. The decoder 100 may be any known system which transmits the frequencies into an output signal in decimal or binary-decimal form to enable or feed the signal to necessary switching equipment, data processing equipment or the like.

Figure 2:
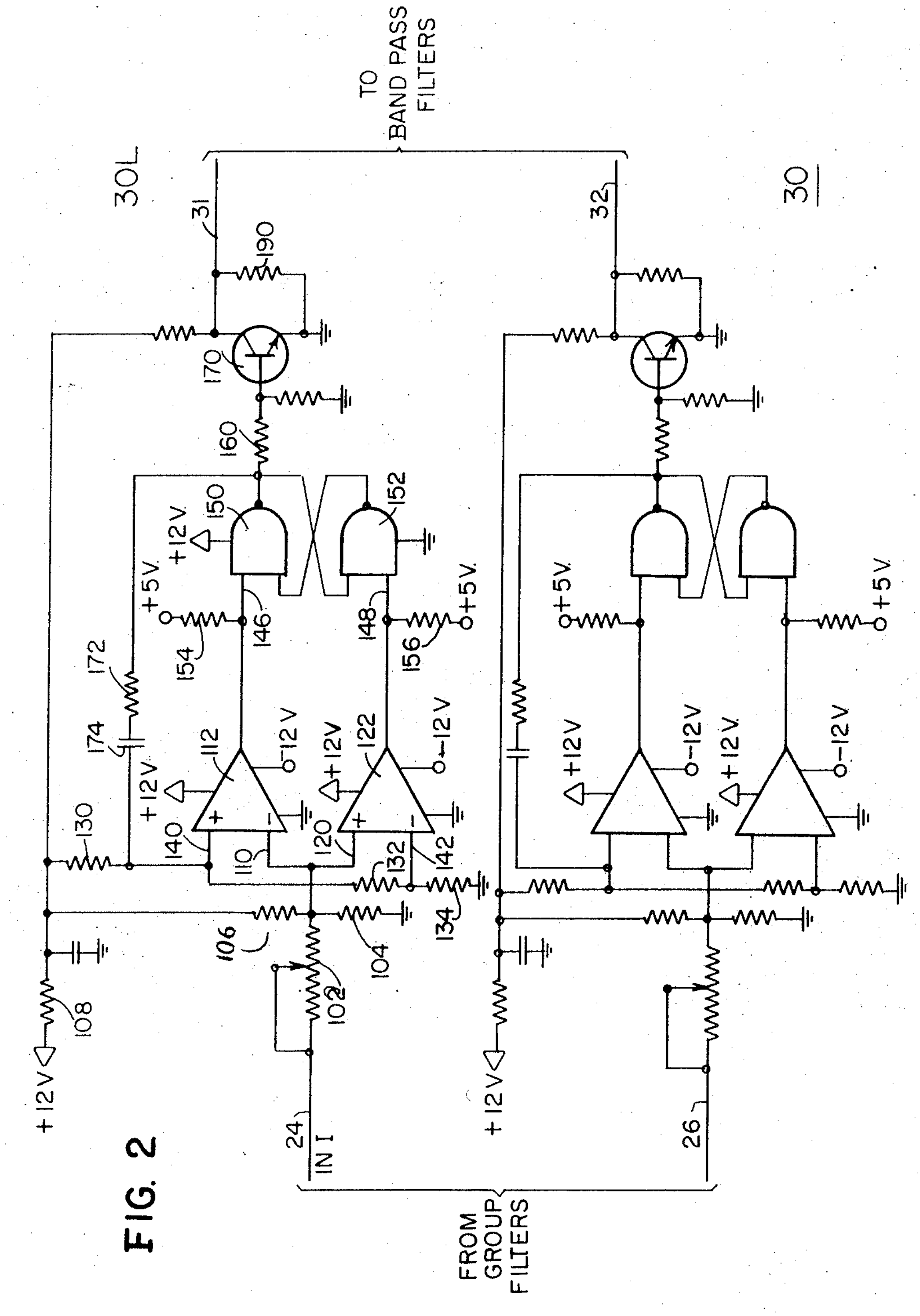
FIG. 2 is a schematic circuit diagram of the limiter employing my invention.

In FIG. 2, I show a schematic circuit for converting sign wave inputs to square waves for transmission to the individual band pass filters for the specific frequencies.

Separate circuits are provided for the passage of tones within the low frequency range, and for those in the high frequency range, the circuit parameters of the resistors and capacitors being identical, the amplifiers and NAND gates modified for each on the limiters 30L (low range) and 3OH (high range). Explanation of one of the limiters 30 (L) will be developed, it being understood that the operation of the other limiter 30H is virtually identical thereto.

At the input to the limiter 30L on lead 24 is an adjustable resistor 102 which is used to adjust the operational level of the limiter. The output from the resistor 102 which provides the signal input to the Limiter 30L is connected to the midpoint of a voltage divider comprised of resistors 104 and 106 which are serially connected between ground and the +12 volt source through the comparatively low resistance of resistor 108. These dividers provide a reference potential for each amplifier to the negative input lead 110 of operational amplifier 112 and to the positive input lead 120 of operational amplifier 122.

The other input to operational amplifiers 112 and 122 is derived from respective voltage dividers comprised of (1) resistors 130 and 132 and (2) resistors 133 and 134, the dividers bridging from ground to the +12 volt source through the minor resistance of resistor 108. Resistors 130 and 134 have identical resistance equal to the resistance of resistors 104 and 106. The resistance of intermediate resistor 132 is approximately one tenth of that of the remaining resistors, and when combined with the variable resistance of resistor 133 provides a small potential difference between the positive input lead 140 of amplifier 112 and the negative input lead 142 to amplifier 122. These input leads 140 and 142 provide reference potentials to the amplifiers for comparison to the signal derived from the group low range filter on lead 24.

It should be noted that the reference potentials applied to the amplifiers are inverted with respect to one another to allow each amplifier 112 and 122 to recreate one half of the square wave output of the received signals.

These amplifiers 112 and 122 are high gain operational amplifiers so that the characteristics of each amplifier approximate on-off switching characteristics, i.e., providing binary states. For example, with a 0.1 voltage change in signal input, the resultant output change is linear in characteristic. However, when a 1.0 voltage change is introduced at the amplifier signal input, the output change is a sharp rise which closely resembles on and off switching.

The output of each amplifier 112 and 122 is individually connected to respective inputs 146 and 148 of NAND gates 150 and 152. Individual bias resistors 154 and 156 provide normal +5 volt bias to the NAND gates. The gates 150 and 152 are normally opposedly biased as shown. The NAND gates are connected in what is termed a Quad Inverter configuration with the output of each gate connected to an input of the other gate. The output 160 of gate 150 is connected to the base of transistor 170, the output transistor, which transmits the square wave signal to output lead 31 via its collector. A feedback loop from output lead 160, including resistor 172 and capacitor 174, provides a delay in the reference input 140 to amplifier 112.

Following the wave form of FIG. 3, the sinusoidal input 180 to lead 24 is shown. When the input signal increases beyond the reference potential, a spike 182 is generated to actuate the NAND gate logic network switching the output from a quiescent state to an active state, as indicated by numeral 184, by rendering transistor 170 conductive to emit the output signal. Declination of the signal amplitude causes amplifier 112 to end its spike signal, however, the NAND gate network remains latched in the active state.

The NAND gates remain latched with the active state with output signal 184 transmitted on lead 31 until the sine wave signal reaches an amplitude in the negative sense greater than the reference potential to amplifier 122, a negative spike 186 is generated by the amplifier to trigger the NAND gate network to its second state, the quiescent state indicated by numeral 188 in FIG. 3. Transistor 170 is shut off and the output is restored to a zero or essentially ground level as imposed by resistance 190 in FIG. 2.

If either the amplifier 112 or 122 is inoperative, no wave form is generated, since a signal from both NAND gates are required to complete the wave form of an output signal. Thus, it can be considered that as far as output is concerned, limiter 30L will shut off on failure of a signal from either amplifier 112 or 122. Further, the operation of both gates must be in synchronism to allow the output signal to be generated.

As mentioned previously, limiter 30H operates in a like manner to generate a signal of frequency dependent on the signal received to transmit its higher frequency signal.

I claim

1. An apparatus for producing essentially square wave signal output from essentially sinusoidal signal input comprising: a pair of voltage sensing members connected to receive an alternating current wave signal in multiple from said input network, means for opposedly biasing said sensing members, means for feeding reference voltages to said sensing members for comparison with the input signals to trigger each of said sensing members on alternate polarity portions of a signal wave, gating means individually connected to each member to receive the output of the sensing member to which connected, a first of said gating means responsive to the initiation of output from a first of said sensing members to initiate a square wave signal, a second of said gating means responsive to the initiation of the output from the other of said sensing members for terminating said square wave, an output path for said square wave signal, said path being common to both said gating means, and a feedback path from said common output path to one of said sensing members to impose a delay thereon.

2. An apparatus as claimed in claim 1, wherein each said gating means comprises a separate NAND gate connected to receive the output of an individual sensing member, and a latching output of each of said gating means connected to the input of the other gating means to retain said wave signal once initiated.

3. An apparatus for producing essentially square wave signal output from essentially sinusoidal signal input comprising: a pair of voltage sensing members connected to receive an alternating current wave signal in multiple from said input network, means for opposedly biasing said sensing members, means for feeding reference voltages to said sensing members for comparison with the input signals to trigger each of said sensing members on alternate polarity portions of a signal wave, individual gating means connected to each member to receive the output of each of said sensing members, a first of said gating means responsive to the initiation of output from a first of said sensing members to initiate a square wave signal, and said other gating means responsive to the initiation of the output from the other of said sensing members for terminating said square wave of said signal, wherein each said sensing member comprises an operational amplifier and wherein there is output means responsive to the output of the first of said amplifiers to initiate said square wave output and a feedback path from the output of the gating means connected to said first member to the signal input of said first amplifier to provide a delay in said input.

4. An apparatus as claimed in claim 3, wherein there is a direct current source, a voltage divider across said source and said reference voltage feeding means is connected to said divider across a resistance therein to offset the voltages fed to one amplifier from those fed to the other.

5. An apparatus as claimed in claim 3, wherein said amplifiers are high gain devices to approximate switching response to the signal input.

* * * * *